W. SCHWARZ.
Potato Digger.
No. 201,894.     Patented April 2, 1878.
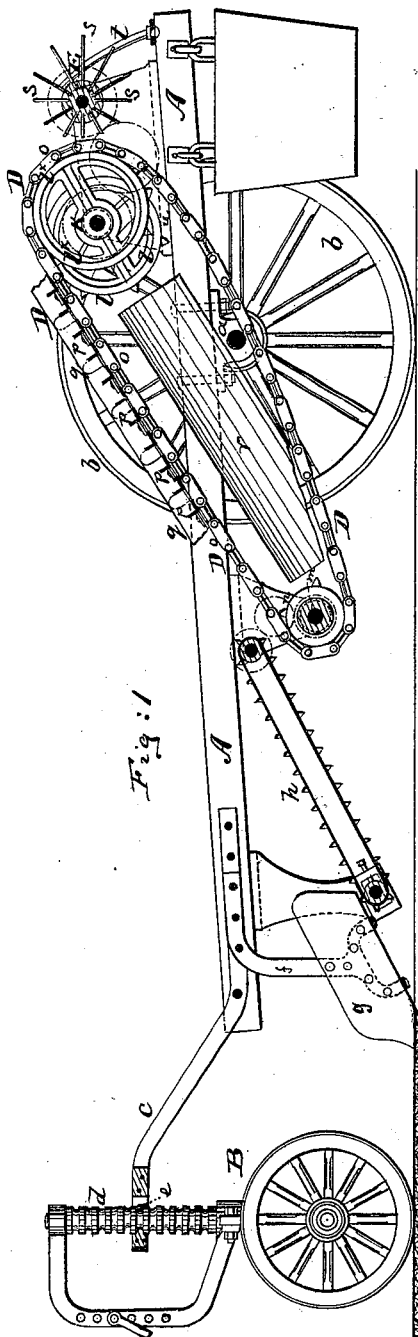
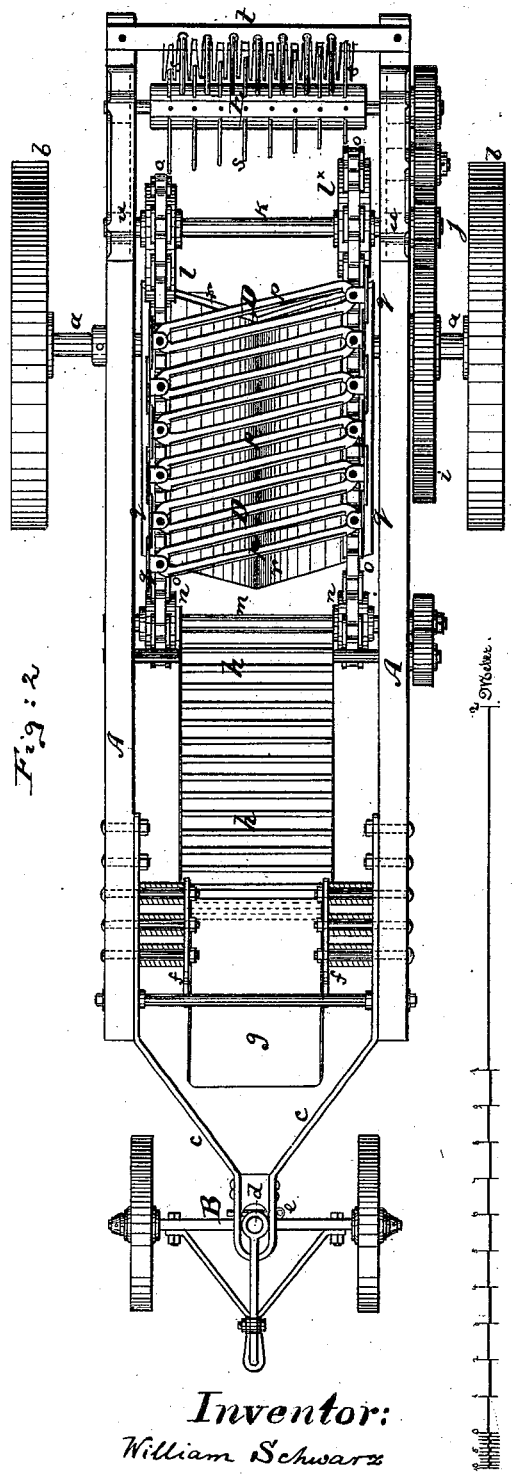
Witnesses:
John C. Tunbridge
P. V. Briesen
Inventor:
William Schwarz
by his attorney
A. v. Briesen

UNITED STATES PATENT OFFICE.

WILLIAM SCHWARZ, OF KOENIGSBERG IN THE NEUMARK, PRUSSIA.

IMPROVEMENT IN POTATO-DIGGERS.

Specification forming part of Letters Patent No. 201,894, dated April 2, 1878; application filed January 28, 1878.

*To all whom it may concern:*

Be it known that I, WILLIAM SCHWARZ, of Koenigsberg in the Neumark, Prussia, have invented a new and useful Improvement in Potato-Diggers, of which the following is a specification:

This invention relates to an improved potato digger and harvester, which, after digging the potatoes from the ground, will effectively and quickly separate them from the soil and weeds.

The invention consists, principally, in providing a potato digger or elevator with an endless screen, which is hung over eccentrics in such manner that every part of the screen, in revolving, will continuously change its position, both in a vertical and horizontal plane. By the worm-like motion thus imparted to the screen it will effectively separate the potatoes from the soil.

The invention also consists in the improved mechanism hereinafter described for separating the potatoes from the weeds, and in other details of improvement hereinafter more fully pointed out.

In the accompanying drawing, Figure 1 is a side elevation, partly in section, of my improved potato digger and harvester. Fig. 2 is a top view of the same.

Similar letters of reference indicate corresponding parts in all the figures.

The letter A represents the frame of the improved potato digger and harvester. Near its rear end it is provided with bearings for the axle $a$, upon which the main wheels $b\ b$ are hung or mounted. The front end of the frame A is connected, by a yoke, $c$, to a carriage, B, in such a manner that said front end can be raised or lowered at pleasure. This may be effected by mounting on the carriage B a vertical stem, $d$, which is provided with a series of grooves, as clearly shown in the drawing, and which extends through an opening in the top of the yoke, so that the yoke $c$ may be connected to the stem $d$ by a pin, $e$, which is passed through the cheeks of the yoke and along any one of the grooves in the stem. This arrangement of grooved stem permits the proper rotation of the front carriage in steering the vehicle. Near the front end of the frame A is attached thereto, by suitable arms $f$, a scoop, $g$, for digging the potatoes from the ground.

Directly behind this scoop is an inclined apron, $h$, hung on two shafts, to one of which rotary motion is imparted by suitable gearing from one of the wheels $b$. The apron $h$ has transverse ribs or slats, so as to carry the potatoes, with the earth and weeds, to its top, and drop them upon the screen D, which will sift the earth from the potatoes. This screen D and the manner of its operation will now be more fully described.

Upon the axle $a$ is mounted, or to one wheel $b$ is attached, a toothed wheel, $i$, which is revolved by the rotation of the wheel $b$, and which meshes into a pinion, $j$, that is mounted upon one end of a shaft, $k$. Said shaft $k$ is hung across the frame A in suitable bearings $u\ u$.

By this mechanism rotary motion will be imparted to the shaft $k$ in direction opposite to that of the axle $a$ or wheel $b$. Upon the shaft $k$ are fastened, at proper distances apart, two eccentric-cams, $l\ l^x$, which are set so that the largest radius of one cam will be diametrically opposite the largest radius of the other, as clearly shown in Fig. 1. $m$ is another transverse shaft, hung in the frame A, beneath the rear end of the apron $h$, and provided with toothed drums or disks $n$ near its ends. The cams $l\ l^x$ are also provided with teeth on their peripheries. Around each cam and the drum or disk, in line therewith, is hung an endless chain, $o$, the links of which are of such size and construction that the teeth on the cams fit between the same, and impart motion to the chains and prevent them from slipping.

The two chains $o\ o$ are connected by a series of slotted or other cross-bars, $p$, having projecting blades, as in Fig. 1, and placed at short distances apart. These cross-bars are fastened to the chains by pivotal connections, so that they may readily vibrate thereon. The chains $o$, with the cross-bars $p$, form the screen D for sifting the potatoes. Overlapping ledge-plates $q\ q$ may be attached to the outer sides of the chains $o\ o$, to prevent the potatoes from falling over the sides of the screen.

It will be seen that by the peculiar arrangement of cams $l\ l^x$, which move the screen D, one side of the screen will be slackened while the other is extended, and that gradually, as the shaft $k$ revolves, the slackened side will be extended and the extended side slackened.

In this manner the screen D will, besides its continuous rotary motion, have a peculiar lateral and up-and-down motion, which will cause the potatoes on the screen to be thoroughly sifted, the earth falling between the cross-bars to the ground, or upon an inclined roof-like plate, $r$, which may, if desired, be secured under the screen, as shown.

In order to separate the potatoes from the weeds, I hang in the frame A, behind the screen D, a shaft, E, which, by suitable gearing, is made to revolve in the same direction as the screen. To this shaft is attached a series of projecting arms, $s\ s\ s$, of different lengths, so arranged that the shortest arms are always opposite to the largest radius of the cams $l\ l^x$ when turned toward them, and vice versa. In this way the arms $s\ s$, turned toward the screen D, will be always about equidistant from the same. At the back of the frame A is affixed across the same a comb-plate, $t$, whose notches correspond to the arms $s$ on the shaft E, so that the arms, in turning, will pass through the slots, and thereby be stripped of the weeds.

The potatoes drop from the screen D into a suitable receptacle, which may be attached to the frame. The weeds are caught by the arms $s$, and held thereon until stripped by the comb, behind which they fall to the ground.

I claim—

1. In a potato-digger, the combination of the frame A with the shaft $k$, having cams $l\ l^x$, and with the shaft $m$ and screen D, all arranged so that a combined rotary and oscillating motion is imparted to the screen D, substantially as and for the purpose specified.

2. The combination, in a potato-digger, of the frame A with the shaft E, having arms $s\ s$ of unequal lengths, and with the screen D, hung on the eccentrics $l\ l^x$, substantially as specified.

3. The combination of the wheeled frame A, having a yoke, $c$, with the carriage B, having stem $d$, said stem being provided with series of grooves to receive the fastening-pin $e$, substantially as specified.

This specification signed by me this 29th day of October, 1877.

WILLIAM SCHWARZ.

Witnesses:
CARL KEOPLER,
BERTHOLD ROI.